US012785426B2

(12) United States Patent
Lee et al.

(10) Patent No.: US 12,785,426 B2
(45) Date of Patent: Nov. 3, 2026

(54) PRESSURIZING CHANNEL AND SECONDARY BATTERY CHARGING/DISCHARGING DEVICE COMPRISING SAME

(71) Applicant: LG ENERGY SOLUTION, LTD., Seoul (KR)

(72) Inventors: Hak Sik Lee, Daejeon (KR); Jun Wan Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 732 days.

(21) Appl. No.: 18/266,767

(22) PCT Filed: Oct. 13, 2022

(86) PCT No.: PCT/KR2022/015469

§ 371 (c)(1),
(2) Date: Jun. 12, 2023

(87) PCT Pub. No.: WO2023/063735

PCT Pub. Date: Apr. 20, 2023

(65) Prior Publication Data

US 2024/0055877 A1 Feb. 15, 2024

(30) Foreign Application Priority Data

Oct. 15, 2021 (KR) ........................ 10-2021-0137447

(51) Int. Cl.
*H01M 10/46* (2006.01)
*H01M 10/04* (2006.01)
(Continued)

(52) U.S. Cl.
CPC ........... *H02J 7/70* (2026.01); *H01M 10/0404* (2013.01); *H02J 7/875* (2026.01)

(58) Field of Classification Search
CPC .. H02J 7/70; H02J 7/875; H02J 7/751; H01M 10/446; H01M 10/0404; H01M 10/0481
(Continued)

(56) References Cited

U.S. PATENT DOCUMENTS

2006/0200972 A1 9/2006 Onishi et al.
2020/0049678 A1 2/2020 Shin et al.

FOREIGN PATENT DOCUMENTS

CN 101378141 A 3/2009
CN 102412445 A 4/2012
(Continued)

OTHER PUBLICATIONS

Machine translation of KR20180044100A (May 2, 2018) (Year: 2018).*

(Continued)

*Primary Examiner* — Edward Tso
(74) *Attorney, Agent, or Firm* — Birch, Stewart, Kolasch & Birch, LLP

(57) ABSTRACT

A pressurizing channel includes a pair of pressurized plates disposable on opposite sides of a secondary battery with the secondary battery interposed therebetween. Each pressurizing plate includes a body part formed with a material that has a first coefficient of thermal expansion; and an exterior part that connects to opposite ends of the body part and includes a thermal expansion part containing a material that has a second coefficient of thermal expansion, which is greater than the first coefficient of thermal expansion. An apparatus for charging and discharging a secondary battery having a plurality of pressurizing channels is also provided.

10 Claims, 5 Drawing Sheets

(51) Int. Cl.
*H02J 7/00* (2006.01)
*H02J 7/70* (2026.01)

(58) Field of Classification Search
USPC ......................... 320/107, 112, 127, 128, 150
See application file for complete search history.

(56) References Cited

FOREIGN PATENT DOCUMENTS

| | | | | | |
|---|---|---|---|---|---|
| CN | 103594745 | A | | 2/2014 | |
| CN | 206180002 | U | | 5/2017 | |
| CN | 105098255 | B | | 8/2017 | |
| CN | 208433485 | U | | 1/2019 | |
| CN | 110612634 | A | | 12/2019 | |
| CN | 112117478 | A | | 12/2020 | |
| JP | 2006-252831 | A | | 9/2006 | |
| JP | 2016-4724 | A | | 1/2016 | |
| JP | 6490287 | B1 | | 3/2019 | |
| JP | 2019-75350 | A | | 5/2019 | |
| JP | 2020-4611 | A | | 1/2020 | |
| KR | 10-2015-0037049 | A | | 4/2015 | |
| KR | 10-2018-0044100 | A | | 5/2018 | |
| KR | 10-2019-0046990 | A | | 5/2019 | |
| KR | 10-2019-0056984 | A | | 5/2019 | |
| KR | 10-2020-0059732 | A | | 5/2020 | |
| KR | 102169162 | B1 | * | 10/2020 | ........ H01M 10/6556 |
| WO | WO-2015141631 | A1 | * | 9/2015 | .......... H01M 50/291 |

OTHER PUBLICATIONS

Machine translation of JP2016004724A (Jan. 12, 2016) (Year: 2016).*
Korean Office Action for Korean Application No. 10-2021-0137447, dated Mar. 18, 2025, with English translation.
International Search Report for PCT/KR2022/015469 (PCT/ISA/210) mailed on Jan. 16, 2023.
Extended European Search Report for European Application No. 22881362.2, dated Jan. 31, 2025.

* cited by examiner

[FIG. 1] CONVENTIONAL ART
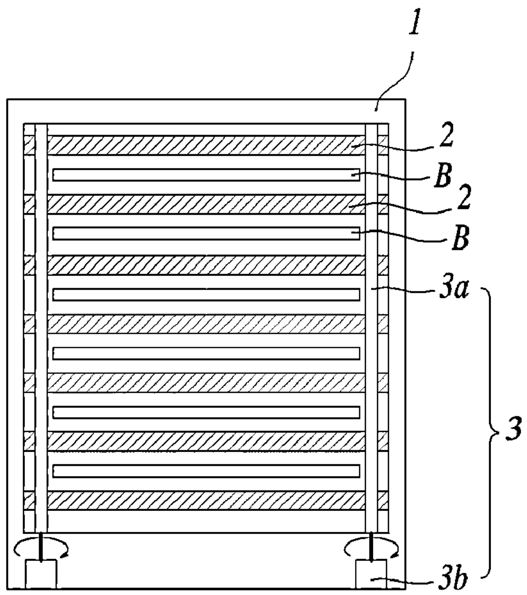
[FIG. 2] CONVENTIONAL ART
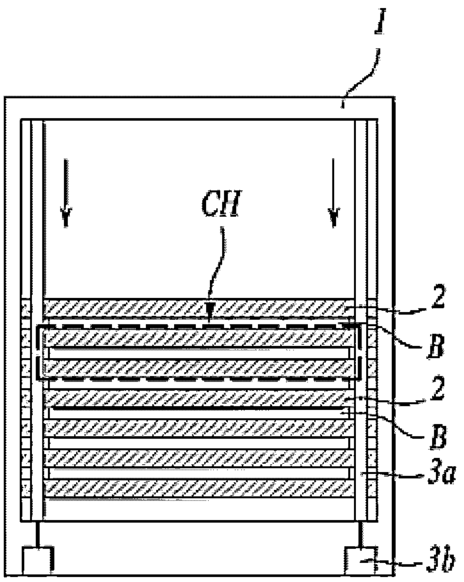

[FIG. 3] CONVENTIONAL ART
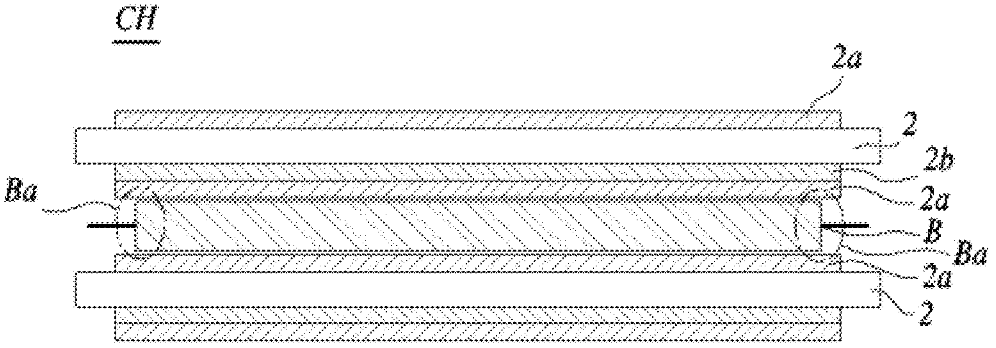
[FIG. 4] CONVENTIONAL ART
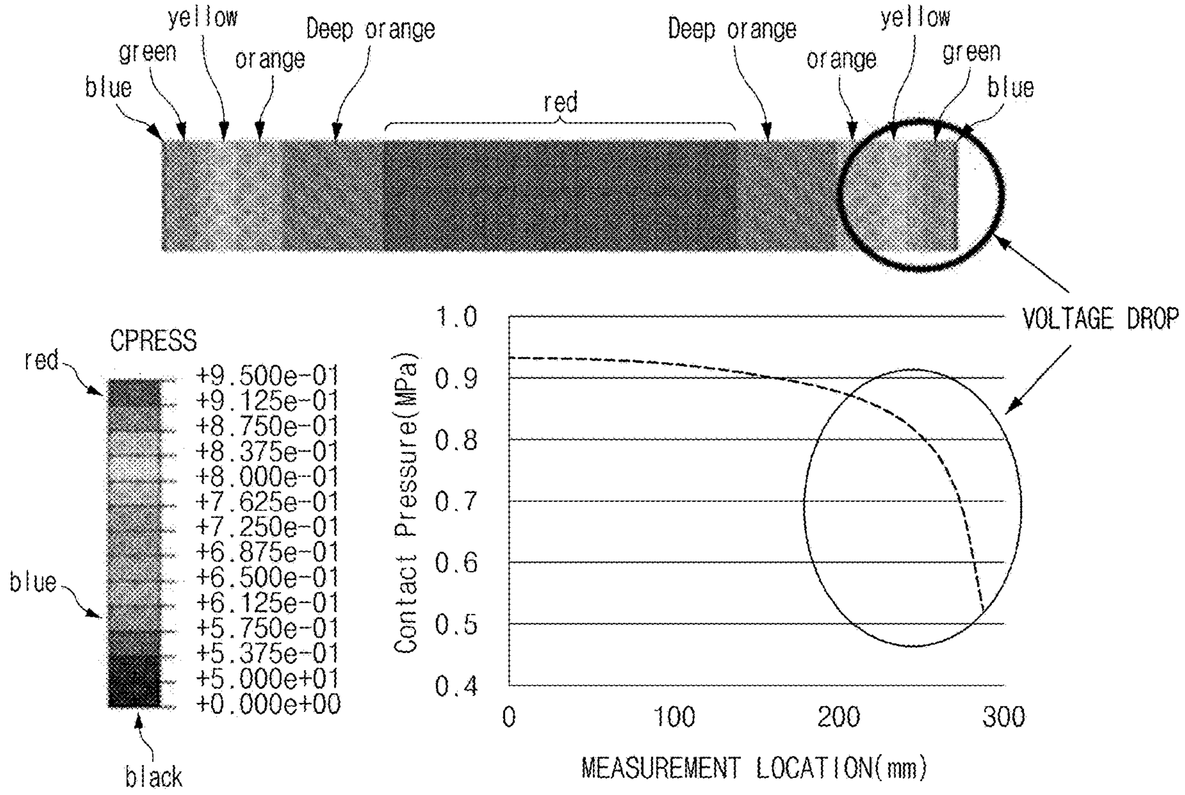

[FIG. 5]
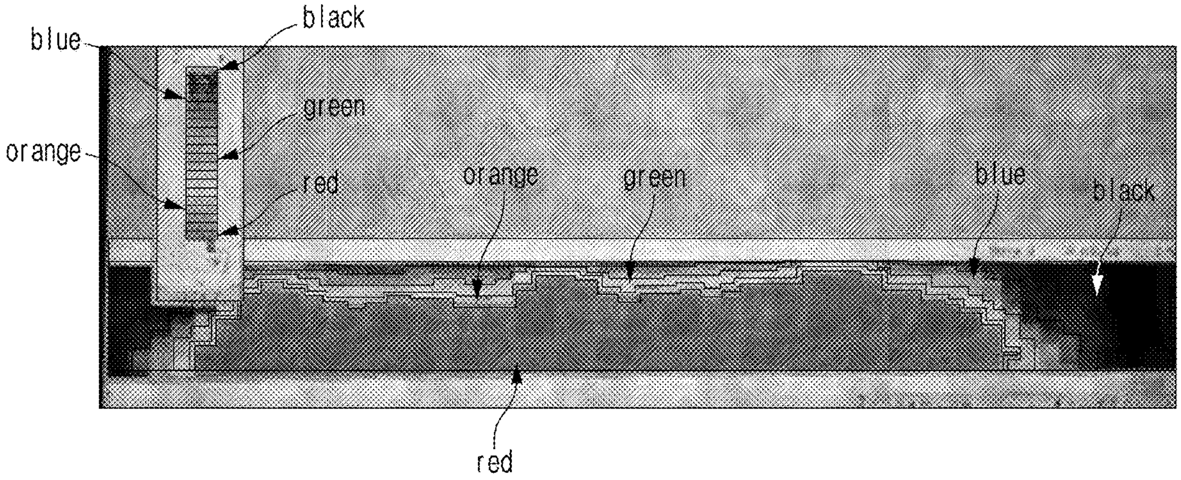
[FIG. 6]
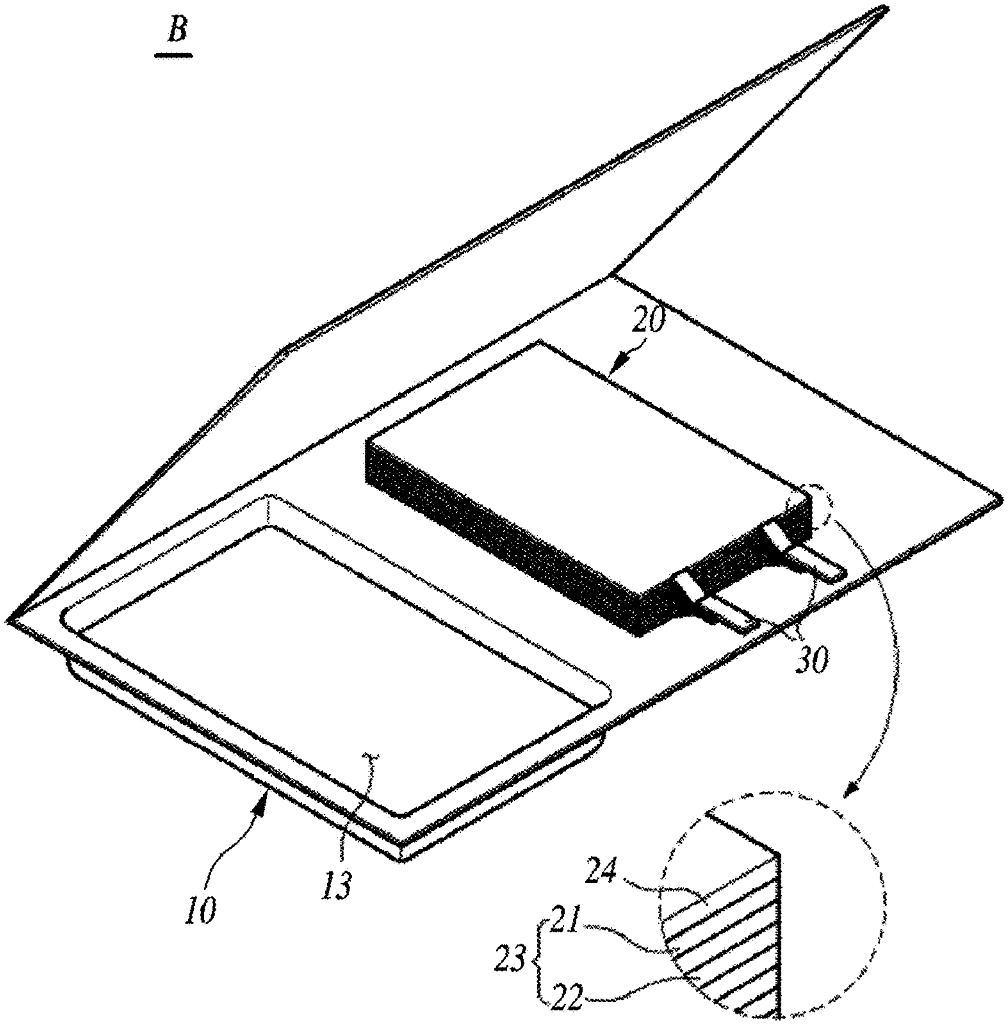

[FIG. 7]
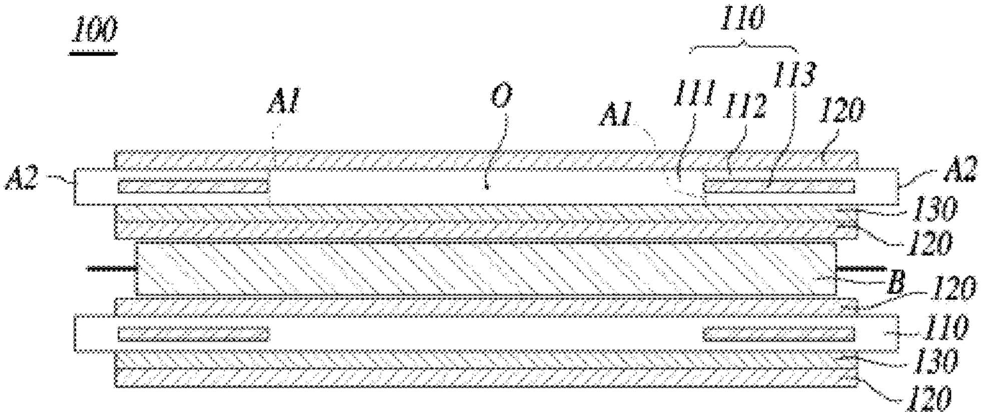
[FIG. 8]
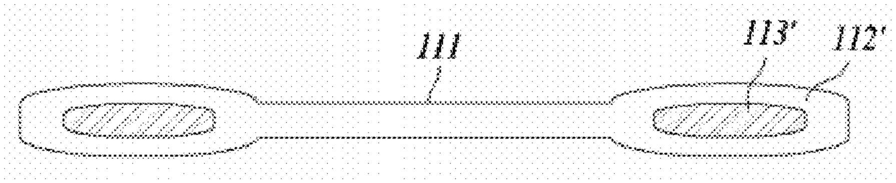
[FIG. 9]
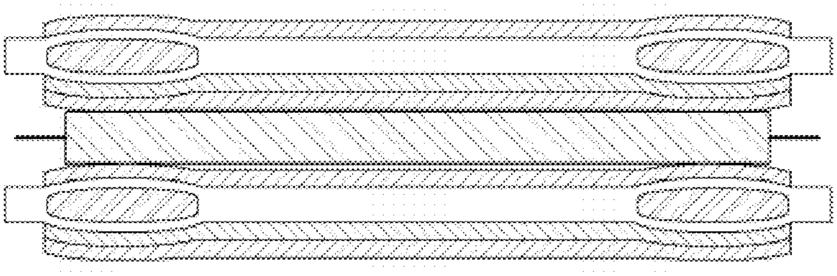

[FIG. 10]
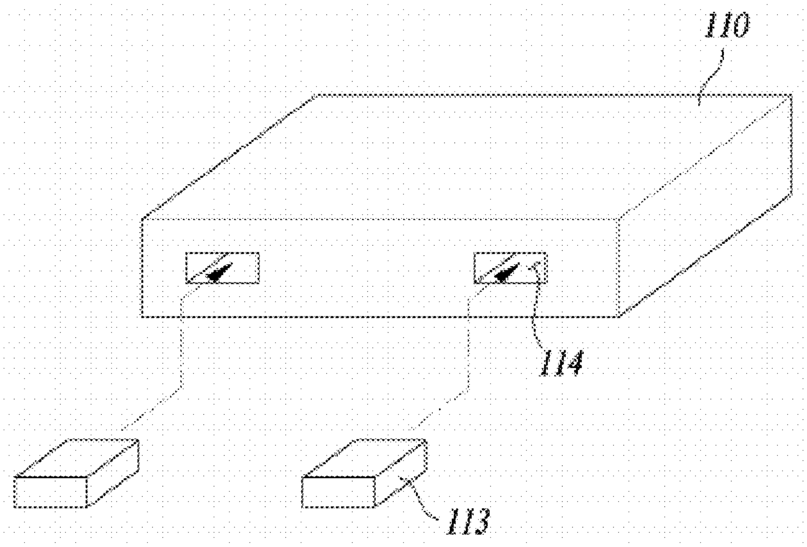

PRESSURIZING CHANNEL AND SECONDARY BATTERY CHARGING/DISCHARGING DEVICE COMPRISING SAME

TECHNICAL FIELD

This application claims the benefit of a priority based on Korean Patent Application No. 10-2021-0137447, filed on Oct. 15, 2021, and the entire contents of the Korean patent application are incorporated herein by reference.

The present invention relates to a pressurized channel and an apparatus for charging and discharging a secondary battery comprising the same.

BACKGROUND TECHNOLOGY OF THE INVENTION

Generally, secondary batteries can be classified into cylindrical, prismatic, pouch-type, etc. depending on its shape. Among them, the pouch-type secondary battery, because its exterior is made up of exterior materials that is composed of a metal layer (foil) and a synthetic resin multilayer that is coated on the lower and upper surface of the metal layer, allows light weighting of a battery by significantly reducing the weight of the battery compared to a cylindrical or a prismatic battery which uses a metal can. A pouch-type battery is also drawing a lot of attention by having an advantage of being able to change into diverse forms.

Such pouch-type secondary battery is stored with an electrode assembly in a layered form. The electrode assembly is connected with an electrode tab and an electrode lead, and the electrode lead is protruded from the pouch exterior material. Such electrode lead is supplied with electric power from external device by being electrically connected to the external device through contact.

A pouch-type secondary battery is manufactured through a process of assembling the cell and activating the battery, and in the battery activation process, the secondary battery cell is loaded to an apparatus for charging and discharging, then the charging-discharging is carried out under necessary conditions for battery activation. As such, the process of carrying out charging-discharging using the apparatus for charging and discharging for battery activation is called a formation process.

By referring to FIG. 1 and FIG. 2, an apparatus for charging and discharging a secondary battery according to conventional art used in formation process is explained. FIG. 1 and FIG. 2 are a drawing that illustrates the apparatus for charging and discharging a secondary battery according to the conventional art.

Referring to FIG. 1 and FIG. 2, the apparatus for charging and discharging a secondary battery according to conventional art includes a frame 1, a pressurized plate 2, and a driving part 3:3*a*, 3*b*. The driving part 3 includes a drive shaft 3*a* and a drive motor 3*b*.

Inside frame 1, multiple pressurized plates 2 are placed, and a secondary battery B that carries out the formation process is placed between the pressurized plate 2 and the pressurized plate 2.

As illustrated in FIG. 1, when the driving shaft 3*a* rotates after the driving motor 3*b* starts rotating, the multiple pressurized plates 2 that are intermeshed move in one direction, and as shown in FIG. 2, the pressurized plates 2 pressurize both sides of the secondary battery B.

A pair of the pressurized plates 2 that is placed on both sides of the secondary battery B with the secondary battery B interposed therebetween forms a pressurized channel unit CH, and the apparatus for charging and discharging a secondary battery has the multiple pressurized channel units CH. Any one of the pressurized plates 2 forms the pressurized channel unit CH and a pressurized channel unit adjacent to it. That is, two adjacent pressurized channels have a structure of sharing one pressurized plate.

FIG. 3 is a cross-sectional view that illustrates a single pressurized channel unit that forms the apparatus for charging and discharging a secondary battery according to the conventional art.

The pressurized channel CH includes a pressurized plate 2, a heating pad 2*b* that is formed on one side of the pressurized plate, and a silicone pad 2*a* that is formed on both sides of the pressurized plate on which the heating pad 2*b* is formed. The secondary battery B is interposed between a pair of opposing pressurized plates 2.

FIG. 4 is a graph for explaining problems caused by the apparatus for charging and discharging a secondary battery according to the conventional art, and FIG. 5 is an image showing the problems caused by the apparatus for charging and discharging a secondary battery according to the conventional art.

By referring to FIG. 4 and FIG. 5, it can be known that when a formation process is carried out by the apparatus for charging and discharging a secondary battery of the conventional art, pressure non-uniformity may occur on both ends Ba of the secondary battery B.

Specifically, by referring to FIG. 4, when the position of one end is 300 mm from the middle (origin O) of the secondary battery, it can be known that a sharp decline in the voltage occurs at 200 mm point. In addition, by referring to FIG. 5, it can be known that the sharp decline occurs at both ends of the secondary battery where formation process is carried out by the apparatus for charging and discharging a secondary battery of the conventional art.

Such a pressure non-uniformity causes a quality degradation phenomenon such as lithium being precipitated. Such pressure non-uniformity is caused by the thickness deviation in the electrical field direction, and the apparatus for charging and discharging a secondary battery of the conventional art is currently not able to sufficiently compensate for this.

DESCRIPTION OF THE INVENTION

Technical Problem

The present invention is directed to providing a pressurized channel that can improve pressure drop in both ends of the secondary battery during the formation process and providing an apparatus for charging and discharging a secondary battery that includes the pressurized channel.

Technical Solution

A pressurizing channel according to an exemplary embodiment of present invention may include a pair of pressurizing plates configured to be disposed on opposite sides of a secondary battery with the secondary battery interposed therebetween. Each pressurizing plate contains: a body part having a first coefficient of thermal expansion; and a pair of exterior parts located at opposite ends of the body part, each exterior part having a thermal expansion part having a second coefficient of thermal expansion greater than the first coefficient of thermal expansion.

The pressurizing channel according to an exemplary embodiment of the present invention may contain a heating pad located on at least one side of each pressurizing plate; and a pair of silicone pads located on opposite sides of each pressurizing plate.

In the pressurizing channel according to an exemplary embodiment of the present invention, body part includes aluminum, the thermal expansion part includes a composite containing at least one or more materials from magnesium, zinc, tin, cadmium, lead, paraffin, or rubber.

The pressurizing channel according to an exemplary embodiment of the present invention, the exterior part or the thermal expansion part may be located at a position ⅔ or more from a center of the pressurizing plate toward a corresponding end of the pressurizing plate.

In the pressurizing channel according to an exemplary embodiment of the present invention, the exterior part may have an inserting space into which the thermal expansion part is inserted.

The apparatus for charging and discharging a secondary battery according to an exemplary embodiment of the present invention may include a frame configured to accommodate multiple secondary batteries therein; and multiple pressurizing channels provided in the frame, each pressurizing channel may include a pair of pressurizing plates located inside the frame, each pair of pressurizing plates may be configured to be disposed on opposite sides with respect to a corresponding one of the multiple secondary batteries so as to have the corresponding one of the multiple secondary batteries interposed therebetween. Each pressurizing plate contains: a body part having a first coefficient of thermal expansion; and a pair of exterior parts located at opposite ends of the body part, each exterior part having a thermal expansion part having a second coefficient of thermal expansion greater than the first coefficient of thermal expansion.

In the apparatus for charging and discharging a secondary battery according to an exemplary embodiment of the present invention, each pressurizing channel may include a heating pad located on at least one side of each pressurizing plate, and a pair of silicone pads located on opposite sides of each pressurizing plate.

In the apparatus for charging and discharging a secondary battery according to an exemplary embodiment of the present invention, the body part may include aluminum, and the thermal expansion part may include a composite containing at least one or more materials from magnesium, zinc, tin, cadmium, lead, paraffin, or rubber.

In the apparatus for charging and discharging a secondary battery according to an exemplary embodiment of the present invention, the exterior part or the thermal expansion part may be located at a position ⅔ or more from a center of the pressurizing plate toward a corresponding end of the pressurizing plate.

In the apparatus for charging and discharging a secondary battery according to an exemplary embodiment of the present invention, the exterior part may have an inserting space into which the thermal expansion part is inserted.

Other details of the exemplary embodiments based on various aspects of the present invention are included in the detailed explanation below.

Advantageous Effects

According to an exemplary embodiment of the present invention, it is possible to improve pressure drop at both ends of the secondary battery that occurs during the formation process.

BRIEF DESCRIPTION OF THE DRAWINGS

FIG. 1 and FIG. 2 are drawings illustrating an apparatus for charging and discharging a secondary battery according to the conventional art.

FIG. 3 is a cross-sectional view that illustrates a single pressurized channel unit that forms the apparatus for charging and discharging a secondary battery according to the conventional art.

FIG. 4 is a graph for explaining problems caused by the apparatus for charging and discharging a secondary battery according to the conventional art.

FIG. 5 is an image showing the problems caused by the apparatus for charging and discharging a secondary battery according to the conventional art.

FIG. 6 is an exploded perspective view illustrating a secondary battery applied to the apparatus for charging and discharging a secondary battery according to an exemplary embodiment of present invention.

FIG. 7 is a cross-sectional view illustrating a single pressurized channel unit that forms the apparatus for charging and discharging a secondary battery according to an exemplary embodiment of the present invention.

FIG. 8 is a drawing conceptually illustrating the exterior part of the pressurized plate expanding as the thermal expansion part expands due to heat.

FIG. 9 is a drawing conceptually illustrating the process of voltage drop on both ends of the secondary battery being prevented by the pressurized channel according to an exemplary embodiment of the present invention.

FIG. 10 is an exploded perspective view illustrating pressurized plate that forms the pressurized channel unit according to another exemplary embodiment of the present invention.

BEST MODE FOR CARRYING OUT THE INVENTION

The present invention may have various modifications and various examples, and thus specific examples are illustrated in the drawings and described in detail in the detailed description. However, it should be understood that the present invention is not limited to specific embodiments, and includes all modifications, equivalents or alternatives within the spirit and technical scope of the present invention.

The terms that the present invention use are only used to explain a specific example and is not intended to limit thereto. A singular expression includes a plural expression unless the context indicates otherwise. The terms "comprise," "include" and "have" used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

First, the secondary battery will be described by referring to FIG. 6. FIG. 6 is an exploded perspective view illustrating the secondary battery applied to the apparatus for charging and discharging a secondary battery according to an exemplary embodiment of the present invention.

Referring to FIG. 6, the secondary battery B contains a battery case 10, an electrode assembly 20 that is accommodated at the accommodating part 13 of the battery case 10, and an electrolyte. Here, an electrode assembly 20 may contain an electrode lead 30 that is electrically connected to the electrode 23.

As a power plant capable of charging and discharging, the electrode assembly 20 can be formed by alternatively layering an electrode 23 and a separation membrane 24.

The electrode 23 may be composed of a cathode 21 and an anode 22. Here, the electrode assembly 20 may form a structure where the cathode 21/the separation membrane 24/the anode 22 are alternatively stacked. And the electrode lead 30 may include a cathode lead that connects to the cathode 21 and an anode lead that connects to the anode 22. In FIG. 6, the electrode lead is illustrated as being formed in one direction of the electrode assembly 20, but it can also be formed in both directions of the electrode assembly 20.

The cathode 21 may contain a cathode current collector and a cathode active material stacked on a cathode current collector. The cathode current collector may be made of an aluminum foil. The cathode active material may be formed of lithium manganese oxide, lithium cobalt oxide, lithium nickel oxide, lithium iron phosphate, or a compound or a mixture containing one or more of these.

The anode 22 may contain an anode current collector and an anode active material layered on an anode current collector. The anode current collector may be made of a foil made of, for example, a copper material. The anode active material may be a compound or a mixture that includes a graphite-based material.

The separation membrane 24 electrically insulates between the cathode 21 and the anode 22 by being made of an insulating material. The separation membrane can be formed of microporous polyolefin-based resin film such as polyethylene and polypropylene.

Next, a pressurized channel according to an exemplary embodiment of the present invention will be explained by referring to FIG. 7 through FIG. 9. FIG. 7 is a cross-sectional view illustrating a single pressurized channel unit that forms the apparatus for charging and discharging a secondary battery according to an exemplary embodiment of the present invention, FIG. 8 is a drawing conceptually illustrating the exterior part of the pressurized plate expanding as the thermal expansion part expands due to heat, and FIG. 9 is a drawing conceptually illustrating the process of voltage drop on both ends of the secondary battery being prevented by the pressurized channel according to an embodiment of the present invention.

As illustrated in FIG. 7, the pressurized channel 100 according to an exemplary embodiment of the present invention contains a pressurized plate 110, a silicone pad 120, and a heating pad 130.

The heating pad 130 is formed on at least one side of the pressurized plate 110 to supply heat to the pressurized plate 110.

The silicone pad 120 is formed on both sides of the pressurized plate 110 on which the heating pad 130 is formed to pressurize the secondary battery B.

A pair of pressurized plates is disposed on both sides of the secondary battery with the secondary battery interposed therebetween. Here, "disposed on both sides" may include a state of being either spaced apart or in contact with both sides of the secondary battery B. During the formation process, when the pressurized plate 110 pressurizes the secondary battery B, a pair of pressurized plate 110 is in a state of being in contact with both sides of the secondary battery B, and if the pressure is released, a pair of pressurized plate 110 is in a state of being spaced apart from both sides of the secondary battery B.

Specifically, the pressurized plate 110 includes a body part 111 and an exterior part 112, and the exterior part 112 includes a thermal expansion part 113. In the following description, the body part 111 and the exterior part 112 are described as separate sections, but in practice, body part 111 and exterior part 112 represents one section of the pressurized plate 110, respectively.

The body part 111 is the middle section of the pressurized plate 110 where there is relatively less voltage drop occurring in the secondary battery B during the formation process. Body part 111 is formed over a predetermined length section (O~A1) in the direction of both ends of the pressurized plate 110 (O-A2 direction) with the middle of the pressurized plate 110 as the origin O.

The end A1 of the body part 111 is where sharp decline in voltage of the secondary battery B occurs, and by referring to the above-mentioned FIG. 4 and FIG. 5, it can be known that the position of the end A1 of the body part 111 is approximately ⅔ of the distance from the origin O of the pressurized plate 110 to the one end A2 of the pressurized place 110.

Accordingly, the exterior part 112 that forms connection with the body part 111 is formed in a position greater than or equal to ⅔ in the direction of one end of the pressurized plate 110 from the origin O. The thermal expansion part 113 formed in the exterior part 112 is also formed at a position approximately ⅔ or more from the origin O of the pressurized plate toward on end of the pressurized plate 110.

The exterior part 112 is an outer region of the pressurized plate 110 where sharp drop in voltage of the secondary battery B occurs during the formation process. Referring to above-mentioned FIG. 4 and FIG. 5, the exterior part 112 is formed over the section from the end A1 of body part 111 to the one end A2 of the pressurized plate 110. That is, the exterior part 112 covers the predetermined length area (A1~A2).

The body part 111 and the exterior part 112, as an individual section of the pressurized plate 110, may be formed of the same material. The body part 111 and the exterior part 112 may be formed of a metal that has a first coefficient of thermal expansion. The metal with first coefficient of thermal expansion, for example, may be aluminum.

The exterior part 112 includes a thermal expansion part 113. The exterior part 112 may be formed in a shape where it is wrapping around the thermal expansion part 113. The thermal expansion part 113 contains a material that has a second coefficient of thermal expansion, which has a greater coefficient of thermal expansion compared to the material that comprises the body part 111 and the exterior part 112. A material that has a second coefficient of thermal expansion, for example, may be magnesium, zinc, tin, cadmium, lead, etc. In addition, a material that has a second coefficient of thermal expansion may be a nonmetal such as paraffin, rubber, etc.

When the body part 111 and the exterior part 112 is formed of an aluminum, the thermal expansion part 113 may be formed of an alloy that contains at least one or more of the materials selected from the group consisting of magnesium, zinc, tin, cadmium, lead, etc. In addition, the thermal expansion part 113 may be formed of a composite that contains at least one or more of the materials selected from the group consisting of paraffin and rubber. Moreover, depending on the choice, it may be formed of a composite that contains at least one or more of the materials selected from the group consisting of magnesium, zinc, tin, cadmium, lead, paraffin, and rubber.

More specifically, the thermal expansion part 113 is preferably an alloy or a composite capable of volume expansion of approximately 55~65 μm under a formation process temperature condition (approximately 60° C.).

During the formation process, such thermal expansion part 113 thermally expands more rapidly than the body part 111 and the exterior part 112. As the thermal expansion part 113 gets expanded, the exterior part that wraps around the thermal expansion part 113 also gets expanded (please refer to 112' and 113' of FIG. 8).

Furthermore, as illustrated in FIG. 9, the heating pad and the silicone pad formed in the exterior part 112 region also get expanded to compensate for the thickness deviation of both ends of the secondary battery B, solving the pressure non-uniformity.

Meanwhile, the apparatus for charging and discharging a secondary battery according to an exemplary embodiment of the present invention only differs in the formation in the pressurized channel unit CH, and the rest of the configuration is substantially the same as the formation of FIG. 1 and FIG. 2, so a repeated explanation will be omitted.

Next, by referring to FIG. 10, a pressurized plate that forms a pressurized channel unit according to another embodiment of the present invention will be explained. FIG. 10 is an exploded perspective view illustrating a pressurized plate that forms the pressurized channel unit according to another embodiment of present invention.

By referring to FIG. 10, it can be known that the exterior part 112 of the pressurized plate 110 may contain an inserting space 114 where the above-mentioned thermal expansion part 113 is inserted.

The thermal expansion part 113 can be manufactured to include many different coefficients of thermal expansion by synthesizing various metals/nonmetals. Therefore, according to the change in processing temperature condition or the change in difference in the thickness of both ends of the secondary battery B, it may be possible to cope actively with the various changes in processing conditions by alternatively inserting a thermal expansion part 113 with an appropriate coefficient of thermal expansion.

As above, the present invention has been described with reference to exemplary embodiments, but it should be understood by those skilled in the art or those of ordinary skill in the art that the present invention can be variously modified and changed without departing from the spirit and technical scope of the present invention described in the accompanying claims.

REFERENCE NUMERALS

100: PRESSURIZED CHANNEL
110: PRESSURIZED PLATE
111: BODY PART 112: EXTERIOR PART 113: THERMAL EXPANSION PART
120: SILICONE PAD
130: HEATING PAD

The invention claimed is:

1. A pressurizing channel comprising:
a pair of pressurizing plates configured to be disposed on opposite sides of a secondary battery with the secondary battery interposed therebetween, each pressurizing plate comprising:
a body part having a first coefficient of thermal expansion; and
a pair of exterior parts extending from opposite ends of the body part, each exterior part having a thermal expansion part having a second coefficient of thermal expansion greater than the first coefficient of thermal expansion, the thermal expansion parts being embedded in the pressurizing plate.

2. The pressurizing channel of claim 1, further comprising:
a heating pad located on at least one side of each pressurizing plate; and
a pair of silicone pads located on opposite sides of each pressurizing plate.

3. The pressurizing channel of claim 1, wherein the body part includes aluminum, and
wherein the thermal expansion part includes a composite containing at least one or more materials from magnesium, zinc, tin, cadmium, lead, paraffin, or rubber.

4. The pressurizing channel of claim 1, wherein the exterior part or the thermal expansion part is located at a position ⅔ or more from a center of the pressurizing plate toward a corresponding end of the pressurizing plate.

5. The pressurizing channel of claim 1, wherein the exterior part has an inserting space into which the thermal expansion part is inserted.

6. An apparatus for charging and discharging a secondary battery comprising:
a frame configured to accommodate multiple secondary batteries therein; and
multiple pressurizing channels provided in the frame, each pressurizing channel defined by a pair of pressurizing plates located inside the frame, each pair of pressurizing plates being configured to be disposed on opposite sides with respect to a corresponding one of the multiple secondary batteries so as to have the corresponding one of the multiple secondary batteries to be interposed therebetween, each pressurizing plate comprising:
a body part having a first coefficient of thermal expansion; and
a pair of exterior parts extending from opposite ends of the body part, each exterior part having a thermal expansion part having a second coefficient of thermal expansion greater than the first coefficient of thermal expansion, the thermal expansion parts being embedded in the pressurizing plate.

7. The apparatus for charging and discharging a secondary battery of claim 6, wherein each pressurizing channel includes:
a heating pad located on at least one side of each pressurizing plate; and
a pair of silicone pads located on opposite sides of each pressurizing plate.

8. The apparatus for charging and discharging a secondary battery of claim 6, wherein the body part includes aluminum, and
wherein the thermal expansion part includes a composite containing at least one or more materials from magnesium, zinc, tin, cadmium, lead, paraffin, or rubber.

9. The apparatus for charging and discharging a secondary battery of claim 6, wherein the exterior part or the thermal expansion part is located at a position ⅔ or more from a center of the pressurizing plate toward a corresponding end of the pressurizing plate.

10. The apparatus for charging and discharging a secondary battery of claim 6, wherein the exterior part has an inserting space into which the thermal expansion part is inserted.

* * * * *